Patented Aug. 10, 1937

2,089,197

UNITED STATES PATENT OFFICE 2,089,197

ZINC HYDROXYLATES OF ESTERS OF PARA-HYDROXYBENZOIC ACID AND PROCESS FOR PRODUCING THE SAME

William H. Engels and John Weijlard, Rahway, N. J., assignors to Merck & Co., Inc., Rahway, N. J., a corporation of New Jersey No Drawing. Application February 8, 1935, Serial No. 5,616

7 Claims. (Cl. 260—11)

The present invention relates to the production of zinc hydroxylates of esters of p-hydroxybenzoic acid suitable for use as dusting powders. The general object of the invention is to provide a series of such compounds which are adapted for use as dusting powders but which also possess a considerable degree of antiseptic value. Other objects and applications will become apparent from the further disclosures herein.

The dusting powders now commonly employed, such as zinc stearate, talc powder, etc.; while possessing properties which cause them to exert cooling and soothing effects, do not possess antiseptic properties and, therefore, do not guard against germ-invasion.

We have now found that the zinc hydroxylates of various esters of parahydroxybenzoic acid prepared by us possess the desired antiseptic value in material degree, so that they may be used to advantage alone or in combination with other of the more commonly used outstanding powders such as zinc stearate, talc powder, etc., for example, particularly when applied to areas where chafing and infection are likely to occur.

Among the esters of parahydroxybenzoic acid which have been prepared by us and found especially efficient for the purpose stated are the ethyl, n-propyl, iso-propyl, n-butyl, iso-butyl, iso-amyl and benzyl esters.

The zinc hydroxylates of this group of esters form white crystalline powders which are substantially insoluble in water. Of these hydroxylates those formed of the iso-propyl and n-butyl esters appear to be especially well adapted for their intended use.

Convenient and preferred methods of making the zinc hydroxylates of the esters of parahydroxybenzoic acid contemplated herein are set forth by way of illustration. Obviously, various of the several steps described may be modified within practical limits, as to quantities and materials employed, without departing from the scope and spirit of the present invention.

Examples

1.—One hundred parts of parahydroxybenzoic acid n-propyl ester are dissolved in 1000 parts of water containing 22 parts of sodium hydroxide. To this is added a solution of 80 parts zinc sulphate U. S. P. in 200 parts of water, with vigorous stirring. After stirring for several hours, the zinc hydroxylate of the parahydroxybenzoic acid n-propyl ester is filtered off, washed with water until free from sulphate and dried at a temperature below 100 C., in the usual manner. It has the following formula:

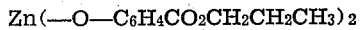

$$Zn(\text{—O—}C_6H_4CO_2CH_2CH_2CH_3)_2$$

The yield is practically quantitative.

2.—One hundred parts of parahydroxybenzoic acid iso-butyl ester are dissolved in a solution of 20.6 parts sodium hydroxide in 1000 parts of water. To this is added a solution of 74.1 parts of zinc sulphate U. S. P. in 200 parts of water, with vigorous stirring. After stirring for several hours the zinc hydroxylate of the parahydroxybenzoic acid iso-butyl ester is filtered off, washed with water until free from sulphate, and dried at a temperature below 100° C. in the usual manner. The yield is practically quantitative.

From the examples set forth by way of illustration, the chemist skilled in the art may readily produce the zinc salt of any desired alkyl or aryl esters of parahydroxybenzoic acid of the types described above by appropriate stoichiometric adaptation of the quantitative relations.

We claim as new:

1. Zinc hydroxylates of esters of parahydroxybenzoic acid, forming white crystalline powders, substantially insoluble in water.

2. Zinc hydroxylates of alkyl esters of parahydroxybenzoic acid, forming white crystalline powders, substantially insoluble in water.

3. Zinc hydroxylates of aryl esters of parahydroxybenzoic acid forming white crystalline powders, substantially insoluble in water.

4. Zinc hydroxylate of parahydroxybenzoic acid iso-propyl ester, forming white crystalline powders, substantially insoluble in water.

5. Zinc hydroxylate of parahydroxybenzoic acid n-butyl ester, forming white crystalline powders, substantially insoluble in water.

6. Zinc hydroxylate of parahydroxybenzoic acid benzyl ester, forming white crystalline powders, substantially insoluble in water.

7. A process for the production of zinc salts of esters of parahydroxybenzoic acid which comprises the steps of dissolving the ester in a solution of alkali-metal hydroxide, adding a solution of zinc sulphate, filtering off the formed zinc salt, and washing the same to free it of excess sulphate, the quantities used throughout being in stoichiometric relations.

WILLIAM H. ENGELS.
JOHN WEIJLARD.